July 17, 1973  A. R. G. HEWETT  3,746,603

SLIP-JOINT CONSTRUCTION

Filed Feb. 9, 1971

Inventor
ANTHONY R. G. HEWETT

By Ross & Ross

Attorneys

United States Patent Office 3,746,603
Patented July 17, 1973

3,746,603
SLIP-JOINT CONSTRUCTION
Anthony Reginald George Hewett, Eastwood, New South Wales, Australia, assignor to Bell's Asbestos and Engineering Pty. Limited, Canberra, Australian Capital Territory, Australia
Filed Feb. 9, 1971, Ser. No. 113,993
Claims priority, application Australia, Apr. 16, 1970, 930/70
Int. Cl. E04b 1/54; E01d 19/06
U.S. Cl. 161—40
2 Claims

ABSTRACT OF THE DISCLOSURE

A slip-joint element for employment in a building or similar structure to accommodate differential expansion or movement between members of the structure. The slip-joint element comprises a laminate structure having a water impervious, resilient support material faced with a material having a co-efficient of friction which decreases with increasing applied load. The laminate structure is adapted to be employed in face-to-face sliding relationship with another such laminate structure, or is foldable upon itself for face-to-face contact, between relatively moveable load and load support members.

---

Figure 1:
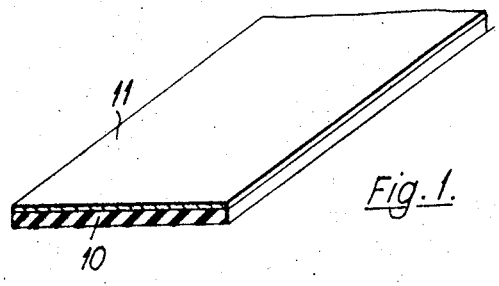

This invention relates to an improved slip-joint construction and, more particularly, to a laminate structure for employment in or as a slip joint.

As is well known, slip joints are required to be provided in building and similar structures to accommodate initial and long term movement between various elements of the structures. Brickwork, for example, is usually protected by the provision of slip-joints between same and roof trusses, beams, floors and non-structural elements such as fascia support.

While various forms of slip joints and materials for employment in slip joints have been evolved, none have proved entirely satisfactory. For example, bitumised felts as employed between walls and wall supported floors of multi-story buildings have been proved to have a short effective life under high compression loads.

It is therefore an object of the present invention to provide an element for employment as or in a slip joint and which at least in part avoids the problems inherent in known structures.

Thus, the present invention provides a slip joint element comprising a laminate structure having a support material faced with a material having a low co-efficient of friction, one such laminate structure being adapted to be employed in face-to-face sliding relationship with another such laminate structure, or the laminate structure being foldable upon itself for face-to-face contact, between a relatively moveable load and load support structure.

In accordance with one form of the invention the support material comprises a rubber, synthetic rubber (e.g. neoprene) or other similar water impervious resilient sheet material and the facing material comprises a sheet material having a coefficient of friction which decreases with increasing applied load.

In accordance with a second form of the invention a metal, such as aluminium or zinc, which is capable of withstanding the effects of moisture is faced with a sheet material having a co-efficient of friction which decreases with increasing applied load.

The facing material may be bonded to the support material with a suitable adhesive or it may be heat welded to the supporting material. Preferably, the facing material comprises a tetrafluoroethylene polymer or a fluorinated-ethylene-propylene polymer. The tetrafluoroethylene polymer may take the form of reprocessed polytetrafluoroethylene.

Where the support material comprises a metal sheet, the surface thereof opposite that to which the facing is applied may be shot-blasted or otherwise roughened to provide for positive engagement with the surface against which it bears. In this way at least a major component of movement between a supporting and a supported member may be accommodated at the slip joint by relative movement between the two laminate structures.

The present invention also provides a building or the like construction having a supported element bearing upon a supporting element through a slip joint, said slip joint comprising a pair of laminate structures disposed in face-to-face slidable relationship and each of said laminate structures comprising a support material faced with a material having a low co-efficient of friction. The laminate structures may comprise, in effect, a single laminate, folded upon itself for face-to-face contact, and the expression "pair of laminate structures" is to be understood in this context.

By "or the like construction" is above meant any construction having or composed of supported and supporting elements which are liable to differential or relative movement. The invention is not limited to, for example, multi-story buildings but is applicable for construction of dams or the like where one layer of concrete is poured upon another.

Figure 2:
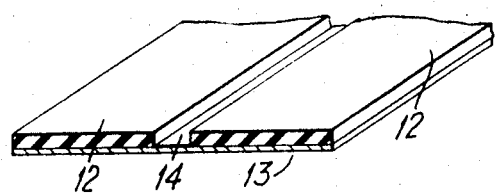
Figure 3:
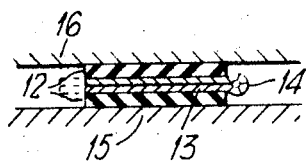
Figure 4:
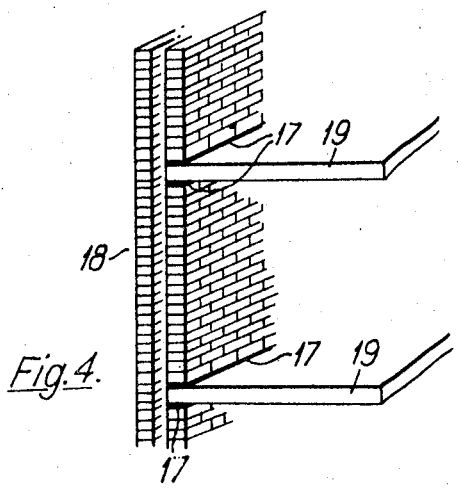

The invention will be more fully understood from the following description of preferred embodiments thereof taken in conjunction with the accompanying drawings wherein, FIG. 1 shows an elementary form of a slip-joint element, FIG. 2 shows another, preferred, form of the slip-joint element, FIG. 3 illustrates the slip-joint element of FIG. 2 in an operable position between a supporting and a supported member, and FIG. 4 illustrates a typical application of a slip-joint in a floor supporting cavity wall.

The slip-joint element of FIG. 1 comprises a laminate structure having a support strip 10 faced with a strip of 0.005–0.010 inch thick tetrafluoroethylene sheeting 11. The support strip 10 comprises a neoprene sheeting having a thickness of .125 inch, and the facing strip 11 preferably comprises a strip of reprocessed polytetrafluoroethylene. The neoprene sheeting preferably has a hardness falling within the range 40 to 70 on the Shore hardness scale.

The facing strip is bonded to the support strip using a synthetic resin adhesive.

In a modified form of the above described element the supporting strip 10 comprises an aluminum sheeting having a thickness in the order of 0.010–0.030 inch. The surface of the aluminum sheeting opposite that to which the facing strip 11 is bonded is preferably shot-blasted or otherwise roughned in order to reduce any tendency of the supporting strip 10 to slide relative to a surface against which it bears in service.

A slip-joint would be composed of two of the elements shown in FIG. 1 disposed in face-to-face contact between a supporting member and a supported member. (By "face-to-face contact" is, of course, meant contact between the facing strips 11 of confronting or overlying elements.) Alernatively, where the element of FIG. 1 is formed as a sufficiently wide strip, it may be molded upon itself about a longitudinal axis for face-to-face contact between the facing strip 11.

As shown in FIG. 2, the element for employment as a slip-joint comprises two spaced-apart, parallel elongated support strips 12 of neoprene sheeting which are faced (by bonding) with a common strip 13 of reprocessed polytetrafluoroethylene.

The support strips are each four inches wide by 0.062 inch thick, while the facing strips 13 is nine inches wide by approximately 0.010 inch thick. The two support strips 12 are thus spaced-apart by a one inch wide intermediate strip 14 of the facing material.

In forming a slip-joint between a supporting element 15 and a supported element 16, as shown in FIG. 3, the facing material 13 is folded upon itself to provide two similar structures in face-to-face confronting relationship, with the intermediate strip 14 forming a seal along one edge of the structure. This then prevents moisture ingress through the slip-joint from one side thereof.

The facing material 13 may be bonded to the support strips 12 in such manner that it projects beyond the respective free sides of the strips (as shown in dotted outline in FIG. 3) and such that, when the structure is folded upon itself, the projections may be mutually bonded to provide a complete moisture seal.

The elements above described may be made in widths ranging from, for example, two inches to nine inches to suit particular applications and in (rolled) lengths of between, for example, 50 and 100 feet. The elements may be employed wherever slip-jointing is required and, as will be appreciated, when the support strip 10 or 12 comprises a resilient, water impervious material, the elements will perform the additioinal function of a weather flashing.

A typical application of the present invention is illustrate din FIG. 4 wherein slip-joint elements 17 are located between courses of an inner wall of a brick cavity wall 18 and concrete floors 19 supported by the wall.

I claim:

1. In a structure having a supported element bearing upon a supporting element through a slip-joint, said slip-joint comprising a pair of laminate structures disposed in face-to-face slidable relationship, each laminate structure comprising a support material comprising a synthetic rubber faced with a facing material comprising polytetrafluoroethylene.

2. In a structure having a supported element bearing upon a supporting element through a slip-joint, said slip-joint comprising a single laminate structure having two spaced-apart parallel strips of a support material comprising synthetic rubber faced with a common strip of a facing material, the facing material comprising polytetrafluoroethylene, and the laminate structure being folded upon itself in face-to-face slidable contact.

References Cited

UNITED STATES PATENTS

| | | | |
|---|---|---|---|
| 2,809,130 | 10/1957 | Rappaport | 161—189 X |
| 3,350,821 | 11/1967 | Jones | 52—573 X |
| 2,867,864 | 1/1959 | Githens | 52—631 X |
| 3,431,160 | 3/1969 | Usui et al. | 161—189 X |
| 2,699,656 | 1/1955 | Anderson et al. | 308—DIG. |
| 2,868,575 | 1/1959 | Hawxhurst | 288—16 |
| 2,885,248 | 5/1959 | White | 308—DIG. 7 |
| 2,907,612 | 10/1959 | White | 161—189 X |
| 2,910,329 | 10/1959 | Runton | 161—189 X |
| 3,101,961 | 8/1963 | White | 308—DIG. 7 |
| 3,649,437 | 3/1972 | Wolinski et al. | 161—254 X |
| 3,654,053 | 4/1972 | Toedter | 161—99 X |
| 3,667,182 | 6/1972 | Stemler | 52—573 X |
| 3,671,369 | 6/1972 | Kvalheim et al. | 161—40 |
| 3,663,350 | 5/1972 | Stokes | 161—254 X |

HAROLD ANSHER, Primary Examiner

U.S. Cl. X.R.

52—29, 573; 161—102, 145, 189, 218, 254; 287—189.36 R, 189.36 S